US 7,027,416 B1

(12) United States Patent
Kriz (10) Patent No.: US 7,027,416 B1
(45) Date of Patent: Apr. 11, 2006

(54) MULTI TIER WIRELESS COMMUNICATION SYSTEM

(75) Inventor: Jeffrey J. Kriz, Eden Prairie, MN (US)

(73) Assignee: Honeywell, Inc., Minneapolis, MN (US)

( * ) Notice: Subject to any disclaimer, the term of this patent is extended or adjusted under 35 U.S.C. 154(b) by 0 days.

(21) Appl. No.: 08/941,963

(22) Filed: Oct. 1, 1997

(51) Int. Cl.
  *H04Q 7/00* (2006.01)
(52) U.S. Cl. ..................................... 370/328
(58) Field of Classification Search ............... 370/310, 370/311, 313, 315, 328, 329, 338, 340, 341; 455/343, 422, 445, 523, 574; 340/3.1–319, 340/870.11, 870.12, 870.13, 870.14, 870.15
  See application file for complete search history.

(56) References Cited

U.S. PATENT DOCUMENTS

| | | | |
|---|---|---|---|
| 3,886,330 A | 5/1975 | Egelston et al. ....... | 235/151.21 |
| 3,903,402 A | 9/1975 | Petit et al. ............ | 235/151.21 |
| 4,006,460 A | 2/1977 | Hewitt et al. ............... | 340/149 |
| 4,162,486 A | 7/1979 | Wyler ........................ | 340/310 |
| 4,367,458 A | 1/1983 | Hackett | |
| 4,442,426 A | 4/1984 | Heuschmann et al. ...... | 340/539 |
| 4,523,184 A | 6/1985 | Abel ......................... | 340/539 |
| 4,594,580 A | 6/1986 | Nelson ....................... | 340/521 |
| 4,603,325 A | 7/1986 | Marino et al. ............. | 340/539 |
| 4,611,198 A | 9/1986 | Levinson et al. | |
| 4,630,035 A | 12/1986 | Stahl et al. | |
| 4,661,804 A | 4/1987 | Abel ......................... | 340/539 |
| 4,692,742 A | 9/1987 | Raizen et al. ............... | 340/539 |
| 4,737,770 A | 4/1988 | Brunius et al. ............. | 340/539 |
| 4,754,261 A | 6/1988 | Marino ....................... | 340/514 |
| 4,755,792 A | 7/1988 | Pezzolo et al. ............. | 340/538 |
| 4,803,487 A | 2/1989 | Willard et al. | |
| 4,855,713 A | 8/1989 | Brunius ...................... | 340/506 |
| 4,912,461 A | 3/1990 | Cenzano, Jr. et al. | |
| 4,951,029 A | 8/1990 | Severson .................... | 340/506 |
| 4,977,577 A | 12/1990 | Arthur et al. .................. | 375/1 |
| 5,010,583 A * | 4/1991 | Parken .......................... | 455/9 |
| 5,032,845 A * | 7/1991 | Velasco ...................... | 342/457 |

(Continued)

FOREIGN PATENT DOCUMENTS

CH         627601 A    1/1982

(Continued)

OTHER PUBLICATIONS

"Oil & Gas Wide-Area Networking", Total Plant brochure published by Honeywell Inc., 6 pages (Aug. 1993).

*Primary Examiner*—Kwang Bin Yao
(74) *Attorney, Agent, or Firm*—Schwegman, Lundberg, Woessner & Kluth, P.A.

(57) ABSTRACT

A monitoring system is provided with a two tier communication network. Multiple first tier nodes comprising wireless or RF sensors are each equipped with transceivers operating at a first, low power level. Multiple second tier nodes are spaced to communicate with selected sensors at the lower bandwidth level, and also communicate with each other at a higher power level and higher bandwidth, to route sensor communications to a central controller. The sensors comprise standard home and small business sensors such as motion detectors, glass breakage, pressure, temperature, humidity and carbon monoxide sensors to name a few, each equipped with a transceiver. The sensors are placed throughout a structure to be protected or monitored. Since such structures can be quite large, several second tier routers are provided such that at least one is within range of each sensor to receive its low power signals. A routing table is dynamically generated to direct communications between routers and the controller

25 Claims, 5 Drawing Sheets

U.S. PATENT DOCUMENTS

| | | | | |
|---|---|---|---|---|
| 5,067,136 | A | 11/1991 | Arthur et al. | 375/1 |
| 5,095,493 | A | 3/1992 | Arthur et al. | 375/1 |
| 5,134,644 | A | 7/1992 | Garton et al. | |
| 5,311,542 | A | 5/1994 | Eder | 375/1 |
| 5,351,270 | A * | 9/1994 | Graham et al. | 375/200 |
| 5,365,217 | A | 11/1994 | Toner | |
| 5,479,400 | A * | 12/1995 | Dilworth et al. | 370/331 |
| 5,504,746 | A * | 4/1996 | Meier | 370/256 |
| 5,565,855 | A | 10/1996 | Knibbe | 340/825 |
| 5,598,427 | A | 1/1997 | Arthur et al. | 375/200 |
| 5,646,602 | A | 7/1997 | Gertz et al. | 340/825 |
| 5,682,142 | A * | 10/1997 | Loosmore et al. | 340/572 |
| 5,699,357 | A * | 12/1997 | Carvey | 370/347 |
| 5,711,480 | A | 1/1998 | Zepke et al. | |
| 5,806,005 | A * | 9/1998 | Hull et al. | 455/566 |
| 5,809,076 | A * | 9/1998 | Hofmann | 375/257 |
| 5,854,994 | A * | 12/1998 | Canada et al. | 702/56 |
| 5,960,341 | A * | 9/1999 | LeBlanc et al. | 455/426 |
| 5,987,011 | A * | 11/1999 | Toh | 370/331 |
| 5,991,279 | A * | 11/1999 | Haugli et al. | 370/311 |
| 6,047,165 | A * | 4/2000 | Wright et al. | 455/66 |
| 6,128,290 | A * | 10/2000 | Carvey | 370/347 |

FOREIGN PATENT DOCUMENTS

| | | |
|---|---|---|
| EP | 0388756 A | 9/1990 |
| EP | 0407776 A | 1/1991 |
| EP | 0496607 A | 7/1992 |
| EP | 0522200 A | 1/1993 |
| EP | 0714081 A | 5/1996 |
| EP | 0772168 A | 5/1997 |
| GB | 2016770 A | 9/1979 |
| GB | 2235316 A | 2/1991 |
| WO | 9313507 A | 7/1993 |
| WO | 9702677 A | 1/1997 |
| WO | 9724840 A | 7/1997 |

* cited by examiner

MULTI TIER WIRELESS COMMUNICATION SYSTEM

FIELD OF THE INVENTION

The present invention relates to communication systems, and in particular to multi tier communication system for communicating between multiple devices.

BACKGROUND OF THE INVENTION

Home and business security, automation, and monitoring systems, and industrial and factory control and communication systems are becoming more and more sophisticated. When installed during the building of a structure such as a house, business office tower factory or warehouse, remote devices, such as sensors, motors, switches and other actuators may be hardwired into a central control panel without much disruption to use of the structure. However, as the number of devices in such systems increases, the wiring into the central control panel becomes more and more complex. Physical connections must be provided for devices to be added, leading to very large control panels, and strict limits on the expansion capacity of each control system.

A further problem associated with hardwired systems is that devices may be added following completion of construction of a structure, but may require a crew of workers taking many hours, either tearing into walls to add wiring, or the use of additional devices utilizing radio frequency "RF" transmission capability. It is also difficult to integrate new, higher function devices which require high bandwidth data transmission capabilities. Two way communication may also not be provided by existing wired systems. Installing a new system in an existing structure can require significant structure invasive and labor intensive wiring done by a work crew causing much disruption of the use of the structure. Wireless devices can also be used when adding a new system, but when located further from the control panel, they require high power radio transmission capability which is regulated by the Federal Communications Commission (FCC), and are either coupled directly to an AC power source, or contain batteries that need to be replaced quite often. Thus, the use of either wired and wireless devices in such systems can be both costly and inconvenient. The use of both wired and wireless devices leads to increased complexity and compounds the problems associated with each.

There is increasing interest in using wireless devices to alleviate some of the wiring problems described above. The FCC provides for use of low-power communication devices under Part 15 of its rules. Part 15 permits unlicensed operation of devices at selected frequencies at low powers to promote the use of such devices. The low power operation ensures that there will be little interference, especially when used by spread spectrum systems which reduce power density of electromagnetic radiation transmitted at any frequency or narrow band of frequencies within a total frequency bandwidth. This further reduces the chances of interference between different systems.

However, as discussed above, one problem in using such devices for systems is that the distance such devices can transmit is limited by the available transmission power. As structures in which such systems are installed can be quite large, there is a need to increase the range that a controller can communicate with the devices. Much research has gone into enhancing the power output of transmitters while still complying with FCC regulations. This has lead to the cost of wireless devices increasing dramatically. In addition, higher power levels have shortened battery life, which then require replacing more often. More expensive batteries have somewhat solved this problem, but have dramatically increased the overall cost of the devices. While some devices can be plugged into AC outlets, they are not always conveniently located.

With larger structures being fitted with systems, the distance between devices and a controller has further exacerbated the transmission distance problem. Many times, the controller is located in an inconvenient central location in order to ensure that it can receive transmissions from each device. For further distances, some devices need to be hardwired. Hardwired devices in a mostly wireless system add complexity to the system, further increasing the costs. Also, since the hardwired devices are only used for the longest distances from the controller, the inconvenience and expense of wiring increases.

Many more devices are being used in recent years, including temperature sensors, pressure sensors, level sensors, flow meters, carbon monoxide sensors, motors, switches, actuators, video cameras and other devices found in security systems, automation systems and process control systems. Retrofitting these to existing systems has proven costly. With the advent of voice and video devices and other high function and high bandwidth devices coupled to systems, the demands placed upon system communication networks require higher and higher bandwidth solutions. Making devices with transmitters that can interface into such networks is further increasing the overall cost of the devices.

There is a need for a system which can utilize wireless devices located further from a controller or control panel. There is a further need to be able to place the control panel in any desired location within a structure which is convenient. There is a need to decrease the complexity caused by large numbers of hardwired devices in the system. There is yet a further need to reduce the power consumed by the wireless devices to increase their battery life. There is a need for a communication system having high bandwidth for selected devices which need to transmit data intensive information, and for a communication system that provides bidirectional capability as well as expansion capability for high bandwidth devices. There is still a further need for devices which can be quickly and easily installed with minimal disruption of use of a structure in which the system is installed.

SUMMARY OF THE INVENTION

A two tier communication infrastructure is provided for wireless devices coupled to a controller in a system. Multiple first tier nodes of the communication infrastructure comprise devices which are equipped with transceivers operating at a first, low power level. Multiple second tier nodes are spaced to communicate with selected devices at a low bandwidth level, and also communicate with each other at a higher power level and higher bandwidth, to route communications to the controller.

In one embodiment, the first tier node devices are battery powered and communicate via the first tier using a low power, short range, single chip transceiver operating at unlicensed frequencies such as approximately 300 or 433 MHz. Bidirectional communication is provided, and the power level is low for short range transmission. The low power levels limit the range of transmission, but also provide for extended battery life or the use of cheaper batteries. The transceiver is also very inexpensive and need not be optimized for longer transmission distances. The devices comprise standard home, small business, commercial and industrial sensors, identification tags and actuators such as motion detectors, glass breakage, pressure, temperature, humidity and carbon monoxide sensors, as well as motors and switches controlling automated systems, each equipped with a transceiver. The devices are placed throughout a structure or area to be monitored, protected or controlled. Combinations of security and control can easily be configured for a home or business in one embodiment of the system.

Since some structures or areas can be quite large, several second tier routers are provided such that at least one is within range of each device to receive its low power signals. The routers each have a higher power transceiver, and route the device signals through successive routers to the central controller, which also contains such a transceiver. Similarly, the central controller routes signals back through both tiers to each device for bidirectional communication.

In one embodiment, the second tier transceivers comprise unlicensed ISM band direct sequence spread spectrum signal processors such as those which operate in the United States 918 Mhz, 2.4 GHz and 5.8 GHz bands of frequencies or similar international bands. This provides sufficient bandwidth to easily route data to and from large numbers of devices, including data from compressed voice and compressed video devices and other high function devices, which are usually directly incorporated into a router package since they require higher bandwidth communications. The bandwidth is also sufficient to handle significant expansions of additional retrofitted devices and devices yet to be developed. Retrofitting structures is also made much less labor intensive due to the non-invasive nature of wireless communications. Further, the relatively high power levels and high frequencies reduce interference normally found in many environments which significantly interfere with lower power and lower frequency transmissions, providing enhanced reliability in communications.

Providing a two tier communication system with low power devices and higher power routers allows much more flexibility in the placement of devices relative to the central controller. The central controller may be placed conveniently in a home when used for a security or home automation system, such as near existing power outlets and telephone RJ11 jacks. The central controller may even be a personal or home computer system. Telephones, cellular phones or other personal communication devices may also be used to provide a user interface into the system, eliminating the need for expensive remote control pads.

The second tier of routers can be placed as needed to provide complete coverage for reception of lower power device transmissions. Further flexibility is provided in router placement in that they can be configured to communicate serially through other routers back to the controller, or directly to the controller. Virtually any shape or size structure or area can be fitted with a security, control or monitoring system using the two tier system.

In yet a further embodiment, devices are equipped with a sleep mode, wherein the device is unpowered for significant periods of time. Duty cycles comprising 10% on-time help to greatly conserve battery power, further reducing the cost of maintaining systems. Events sensed, or communication activity causes the device and transceiver to wake up and communicate. Routers are designed to accommodate such duty cycles when communicating with the sensors.

In one embodiment of the invention, the system comprises an asset management system. Each asset to be managed, such as a human, personal computer or other potentially mobile significant asset is provided with a tier 1 device which is simply a low power transmitter or transceiver. Routers are strategically placed within a structure or area, and the controller is aware of their positions. By keeping the transmission power very low, it is more likely that only one router will detect the device. The controller can then track the positions of the "assets" based on which router is receiving the transmissions. In the case where the controller is also coupled to the HVAC system, which may also have multiple devices communicatively coupled to various routers and appropriately adjusts cooling based on the positions of the assets. The controller counts id's associated with each device and estimates heating and cooling needs based on the count.

By being able to utilize low power transceivers in first tier devices, the devices may be made simpler and cheaper than prior devices used in control, monitoring and security systems. The transceivers also more easily meet FCC restrictions and other regulatory body restrictions such as those promulgated by ETSI, and allow the use of a smaller battery, or enable a longer battery life, further reducing the cost of the devices. By using multiple routers, the distance of devices from the controller may be greatly increased without the need for higher power device transceivers or cumbersome and labor intensive wiring. Additional devices and new devices are much more easily integrated into existing systems, including higher bandwidth high function devices. Bidirectional communication is also provided for in the two tier system.

DESCRIPTION OF THE EMBODIMENTS

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the present invention. The following detailed description is, therefore, not to be taken in a limiting sense, and the scope of the present invention is defined by the appended claims.

Figure 1:
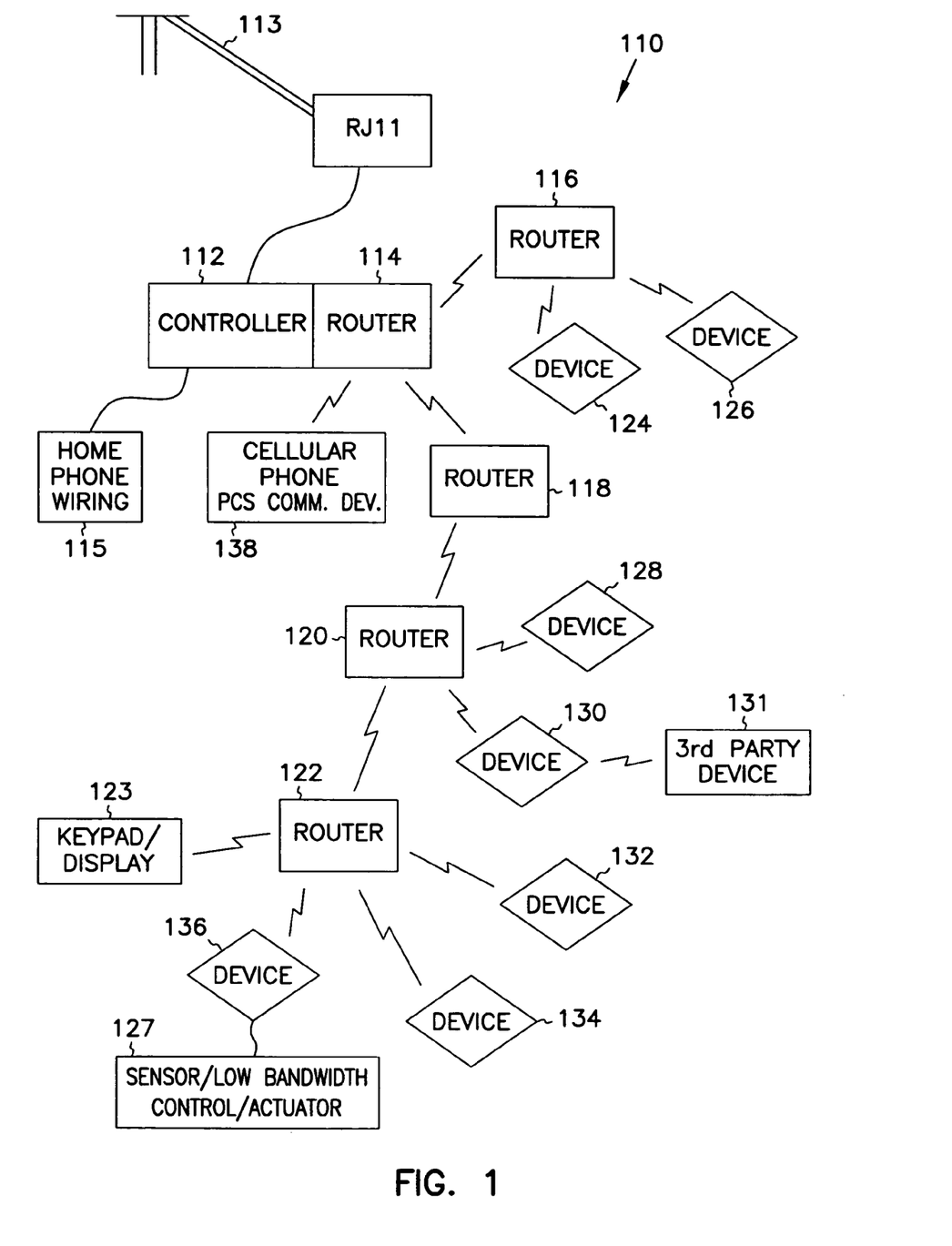
FIG. 1 is a block diagram representation of a system employing a two tier wireless infrastructure of the present invention.

A two tier communication network infrastructure for providing communication for a system is shown generally at 110 in FIG. 1. The system comprises a controller 112 which may be a personal computer, such as a lap top general purpose computer, or a specially designed ASIC based controller as is well known in the art. The controller is coupled to a first router node 114, which may be disposed within the controller 112 as a card hardwired, or coupled to a standard internal bus, or may be a stand alone suitably enclosed device coupled to the controller 112 by a standard interface, such as an RS232 connection. The router 114 is shown in further detail in FIG. 3, but for purposes of describing the overall system can be thought of as a device that contains a dual transceiver for communicating over different tiers of a wireless network with other similar router nodes 116, 118, 120 and 122, and with low power sensing, control and actuator type devices comprising first tier nodes shown at 124, 126, 128, 130, 132, 134, and 136. Device 130 is shown as coupled to a third party device 131, which provide information to be routed to the controller 112 via the network. One example of a third party device may be a garage door opener. Device 136 is coupled to a sensor 127, which is a low bandwidth control or actuator, such as a display, siren, horn or strobe light. Routers comprising the second tier nodes, such as router 122 may also be coupled by a high bandwidth direct wired connection to a keypad/display indicated at 123, which can be a personal computer coupled directly or hardwired to the router 122. The routers themselves may also contain high function devices, such as video cameras which require a high bandwidth for transmission of compressed video for display such as on display 123.

Router 114 also communicates directly with a telephone like device 138, such as a cordless phone which typically operates in the 918 MHZ range, a PCS communication device, cellular phone or GSM or DECT in international markets. The telephone or cordless phone 138 may be used as an extra control pad for the monitoring system. In one embodiment, the controller is hardwired to external phone lines indicated at 113 and further to phone wiring within a home or other structure indicated at 115. This allows the controller 112 to control whether signals from a phone are passed to the external phone lines, or are used to provide commands to the controller 112, much in the manner that a wired keypad would in a home security system. The controller can be set up through a modem which is becoming standard equipment on personal computers to intercept predetermined key sequences and prevent them from being transmitted further on the external phone lines. This provides the benefit of not requiring the user to purchase further expensive components. In an alternative embodiment, the phone 138 communicates directly with router 114 and may even have dedicated keys similar to those on a control pad.

The combination of routers and devices shown in FIG. 1 comprises a security, control or monitoring system which can be used in a structure such as a home or business. It can also be applied to process control, where the devices comprise standard home, small business, commercial and industrial sensors, identification tags and actuators such as motion detectors, glass breakage, pressure, temperature, humidity and carbon monoxide sensors, as well as motors and switches controlling automated systems, each equipped with a transceiver. The devices are placed throughout a structure or area to be monitored, protected or controlled. Combinations of security and control can easily be configured for a home or business in one embodiment of the system.

In one embodiment of the invention, the system comprises an asset management system. Each asset to be managed, such as a human, personal computer or other potentially mobile significant asset is provided with a tier 1 device which is simply a low power transmitter or transceiver. Routers are strategically placed within a structure or area, and the controller is aware of their positions. By keeping the transmission power very low, it is more likely that only one router will detect the device. The controller can then track the positions of the "assets" based on which router is receiving the transmissions. The controller is also coupled to the HVAC system, which may also have multiple devices communicatively coupled to various routers and appropriately adjusts cooling based on the positions of the assets. The controller counts id's associated with each device and estimates heating and cooling needs based on the counts.

The routers communicate with each other over a relatively high bandwidth, using unlicensed Industrial Scientific Medical (ISM) band spread spectrum signal processors or transceivers such as those which operate in the 918 MHz, 2.4 GHz and 5.8 GHz bands of frequencies. This tier of the network provides a high bandwidth communication medium over which information may be transmitted over relatively long distances and are regulated by regulatory agencies, but not licensed. The devices however, are provided with low power and low bandwidth, relatively inexpensive, short range, such as on the order of approximately 3 to 6 meters, single chip transceivers operating at unlicensed frequencies such as approximately 300 or 433 MHZ which are also not directly licensed. Since they are low power, they cannot transmit long distances. When used to sense conditions, or control a further device such as a motor or light switch in a structure, the devices are placed where desired, but proximate a router within the transmission range of the device. The controller 112 is also placed conveniently for the user of the structure, but will likely not be close enough to all of the devices to adequately receive their transmissions. Routers are placed strategically within the structure to receive transmissions from proximately located first tier devices. The routers then forward information in the device transmissions through potentially other routers to the controller. Information and commands from the controller are likewise routed back through the routers to the devices. A routing table is used by the routers to correctly route the information in both directions.

Figure 2:
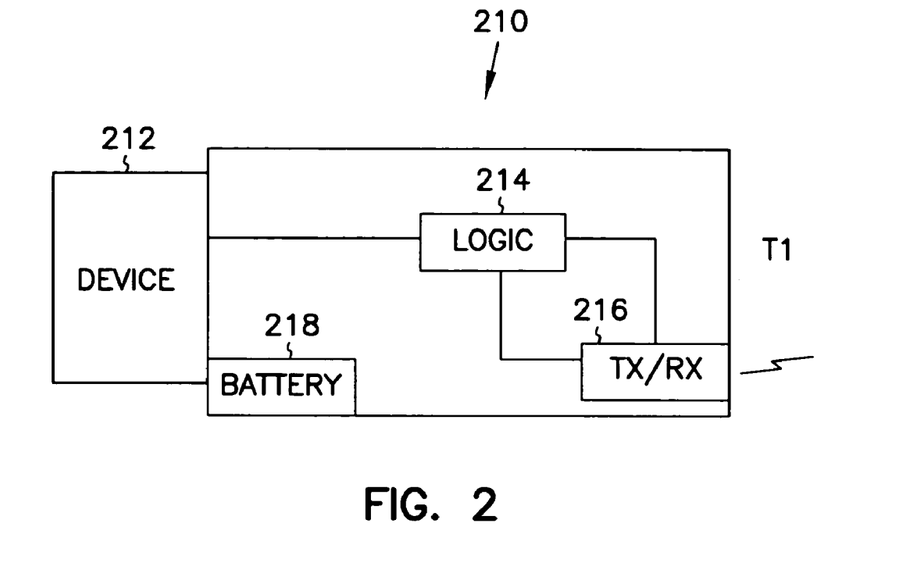
FIG. 2 is a block diagram of a device used in the system of FIG. 1.

A device node 210 is shown in block diagram form in FIG. 2. The node 210 comprises a device 212, such as a motion detector, glass breakage, pressure, temperature, humidity and carbon monoxide sensor, or controller or actuator for control of motors and lights among other functions. The device 212 is coupled to a logic circuit 214 which is further coupled to a low power, low distance transceiver 216 as described above, which is powered by a battery 218 such as a standard 1.5 to 3 volt battery. Logic 214 provides an indication of an event or feedback from device 212, or the status of the device to the transceiver 216, which then transmits information regarding the event. Device 212 may comprise a comparator to compare a sensed parameter with programmed limits. The limits can be set by the controller 112 of FIG. 1, logic 214, or can be hardwired at manufacture. Jumper switches can also be used to set the limits. When a limit is reached or passed, an event is tripped, and a logic one or zero is provided in standard logic levels, or special low voltage logic such as CMOS TTL to logic 214. The sensor 212 can also be of the type that provides analog output. In that case, logic 214 also provides suitable analog to digital conversion functionality. Where device 212 comprises some sort of control, logic 214 provides signals from controller 112 received over the multi tier network to device 212 in the proper format for execution of an action identified by the signals.

Figure 3:
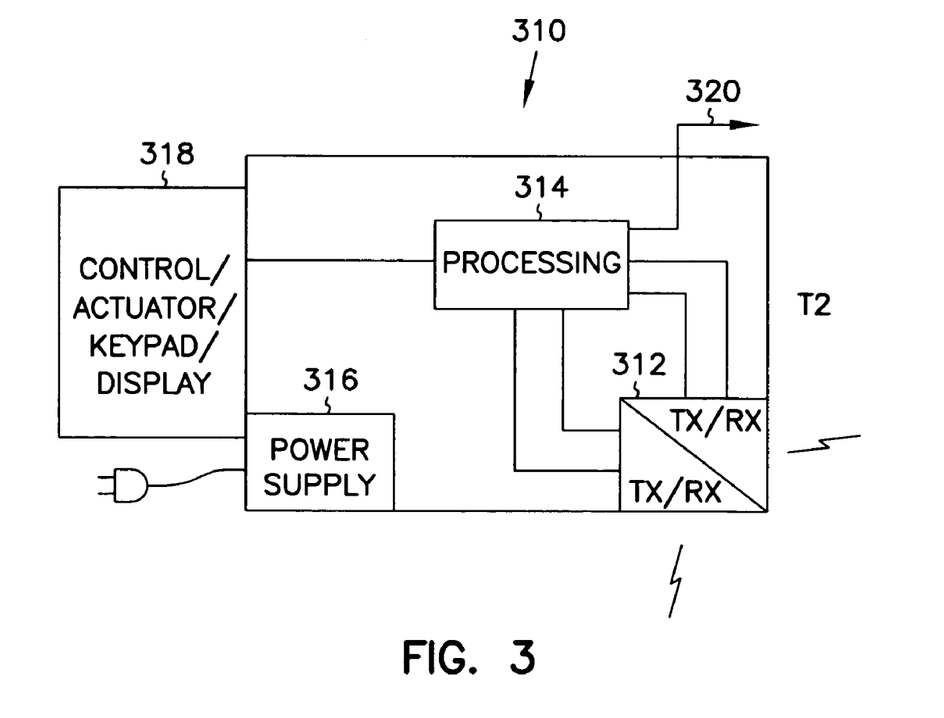
FIG. 3 is a block diagram of a router used in the system of FIG. 1.

A typical router node is shown in FIG. 3 generally at 310. Router node 310 comprises a dual transceiver 312, which receives and transmits on the first tier network at the frequency of transceiver 216 to provide communications to and from multiple device nodes. The first tier network uses a standard communications protocol, such as a TDMA or carrier sense type of network, with the protocol being implemented in a known manner either in the transceiver 216 or logic 214 for the devices, and being implemented in either the transceiver 312 or a processing unit 314 in the router nodes. Processing unit 314 is an ASIC in one embodiment, and provides data I/O functions for a high function device 318 such as an audio or video transducer, control, actuator or keypad/display device, and also provides routing functions for the information flowing through the router. Transceiver 312 also comprises a second tier transceiver, which transmits and receives information to and from further routers. The information can also be sent via a hardwire connection 320 directly from processing unit 314 to the controller 112. In one embodiment, a power supply 316 is coupled to an external power source such as standard 110/240 volt AC power. The power supply 316 may also be completely battery powered, run off DC current, run off various international power levels, and may further comprise a backup battery system. The power supply 316 thus provides much more power than the battery 218 in device 210. Higher function device 318 is of the type that either requires more power than can easily be provided by battery, or requires higher data throughput that can only be conveniently provided by a router 310.

The routers communicate with each other using a high bandwidth TDMA or CDMA protocol which is synchronized to the AC power supply peaks, or via an RF signal generated by a selected router. In one embodiment, all the routers are aligned in time via pulses received over the power lines in the structure in which the monitoring system is installed. In further embodiments, timing pulses may be provided by a central router, the routers are provided very accurate clocks in a further embodiment, or other types of high bandwidth protocols may be used which do not require timing pulses.

In one embodiment, the dual transceiver 312 is implemented by two separate ASICs. The processing module comprises a third ASIC. Further embodiments incorporate the dual transceiver on a single ASIC. The advanced function block 318 is a standard audio or video transducer providing compressed or uncompressed digital output. If uncompressed, the processing unit 314 provides suitable compression for security monitoring purposes, which may result in less than entertainment quality video transmission, but will be adequate for monitoring.

Figure 4:
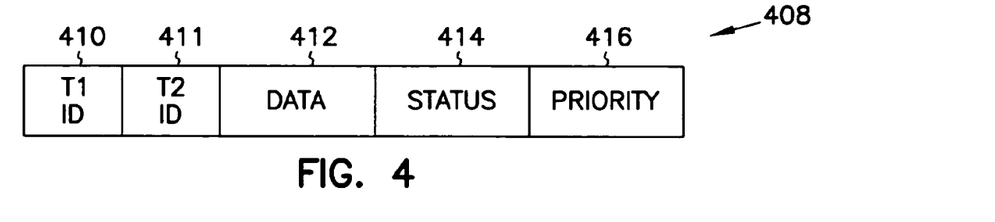
FIG. 4 is a block diagram of data in a packet transmitted by the device of FIG. 2.

A block diagram representation of an information packet 408 passed over the multi tier network is shown in FIG. 4. A tier 1 node device id is indicated at 410, followed by a tier 2 node id at 411. To increase reliability, multiple transmissions for redundancy or error detection/correction coding can be employed, altering the appearance of the data stream. Likewise, encryption can be employed to limit unintended use/reception of the system's information. These capabilities also ensure that multiple different systems installed in close proximity to each other, such as in a condominium complex, do not incorrectly receive messages from adjacent installed systems.

The ids 410 and 411 are used in conjunction with the routing table to properly route bidirectional communications over the network. Data is indicated at 412, Device or router status information is provided at 414. Finally a priority indication is provided at 416. The priority indication is used to ensure that a particularly important communication is transmitted prior to other communications. An example may be the provision of an alarm situation from a sensor. Lower priority information may include a video frame, since high definition video is not important in most applications. Audio information may be given a higher priority than video information due to the difficulty in understanding broken up audio signals. The priority indication may be multilevel depending on the variety of data to be sent over the network.

The information packet 408 enables the controller 112 to determine the source of information received, and ensures that information received from two different routers regarding the same device is not incorrectly handled. Routers may be set up to transfer all information received from tier 1 coupled devices and then to recognize dynamically which tier 1 devices are within range and only transmit information from the controller 112 over the tier 1 frequencies intended for the devices which are within range. Further discussion of this function is provided with reference to dynamically building routing tables in connection with a description of FIG. 7 below.

The information packet 408 is also at least partially encoded. Standard rotating of message coding techniques are used to prevent others from defeating a security system implementation, or from sabotage of industrial process control implementations. The rotating techniques are implemented in logic 214, and may be applied to the fields, but are most likely applied to the data, status and priority fields.

Figure 5A:
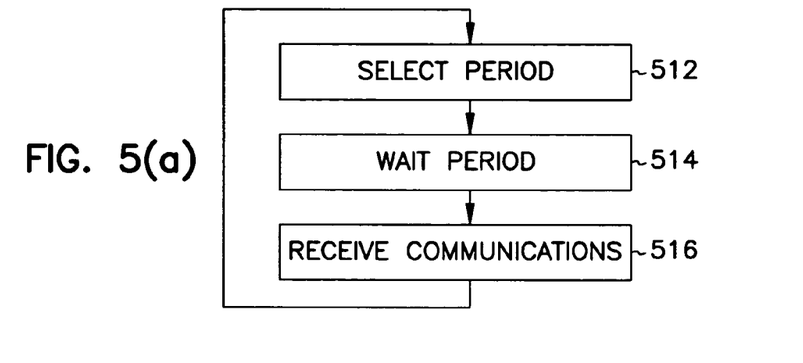
FIG. 5a is a flow chart of power cycling functions in the device of FIG. 2.

In order to further reduce the power requirements of a device 210, duty cycling of the device, including at least a portion of transceiver 216 is provided by logic 214, which is implemented in a power management module in either software, firmware or a combination of both in logic 214. A flow diagram of the logic for doing so is provided in FIG. 5a. A period of time is selected to remove power from the receiver portion at 512. This time period can be random, but should be selected to provide a desired duty cycle, such as providing power only 10% of time. At 514, the selected time period is waited as by use of a counter, and then at 516, power is again supplied to the receiver portion of the transceiver for a selected time period again. At then end of that time period, a new power off period is selected at 512. As mentioned above, the period may be random, but may also be set. In any event, the router most proximate to the device is aware of the power cycling, and plans its transmissions to the device accordingly.

Figure 5B:
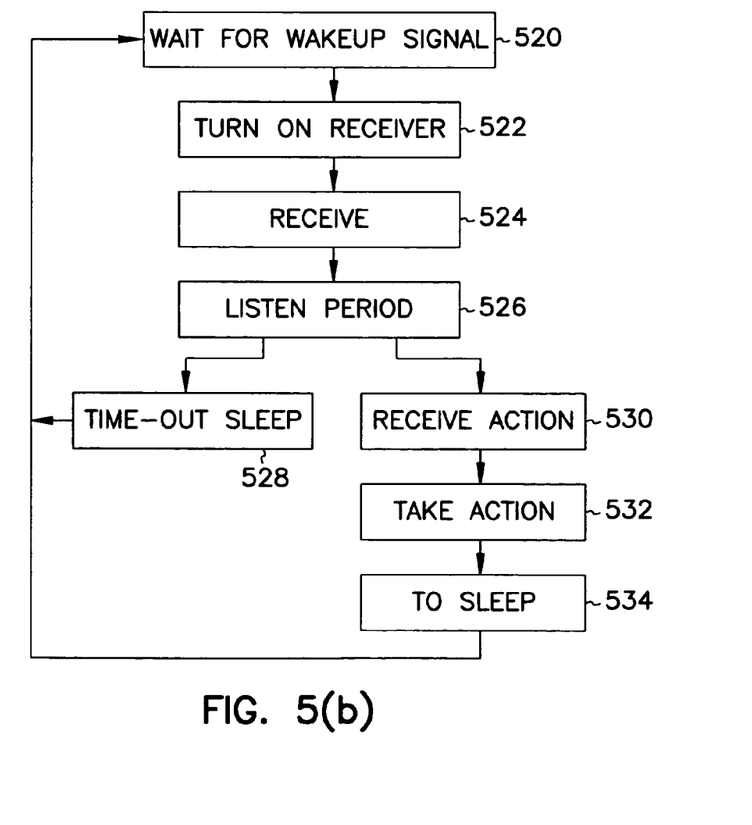
FIG. 5b is a flow chart of an alternative power cycling functions in the device of FIG. 2.

An alternative flow diagram for logic followed in reducing device power requirements is depicted in FIG. 5b. In this embodiment, the device is awakened from a low power sleep mode by receiving a wakeup transmission. At 520, the device is in a sleep mode, waiting for a wakeup signal. When the wakeup signal is received, the receiver is turned on at 522, and placed in a receive mode at 524. A period is waited for receiving information at 526, and if no information is received by the expiration of a timeout period at 528, the device is placed back in sleep mode and control is returned to 520 to wait for the next wakeup signal. If an action is received during the listen period 526 as indicated at 530, then the action is taken by the device at 532, and then the device is placed back in sleep mode at 534 and control is again returned to 520 to wait for the next wakeup signal. Typical actions for a device include responding with status, or a value of a sensed parameter, or taking a control action, such as turning on a light, opening or closing a valve, starting a fan, etc.

Figure 6:
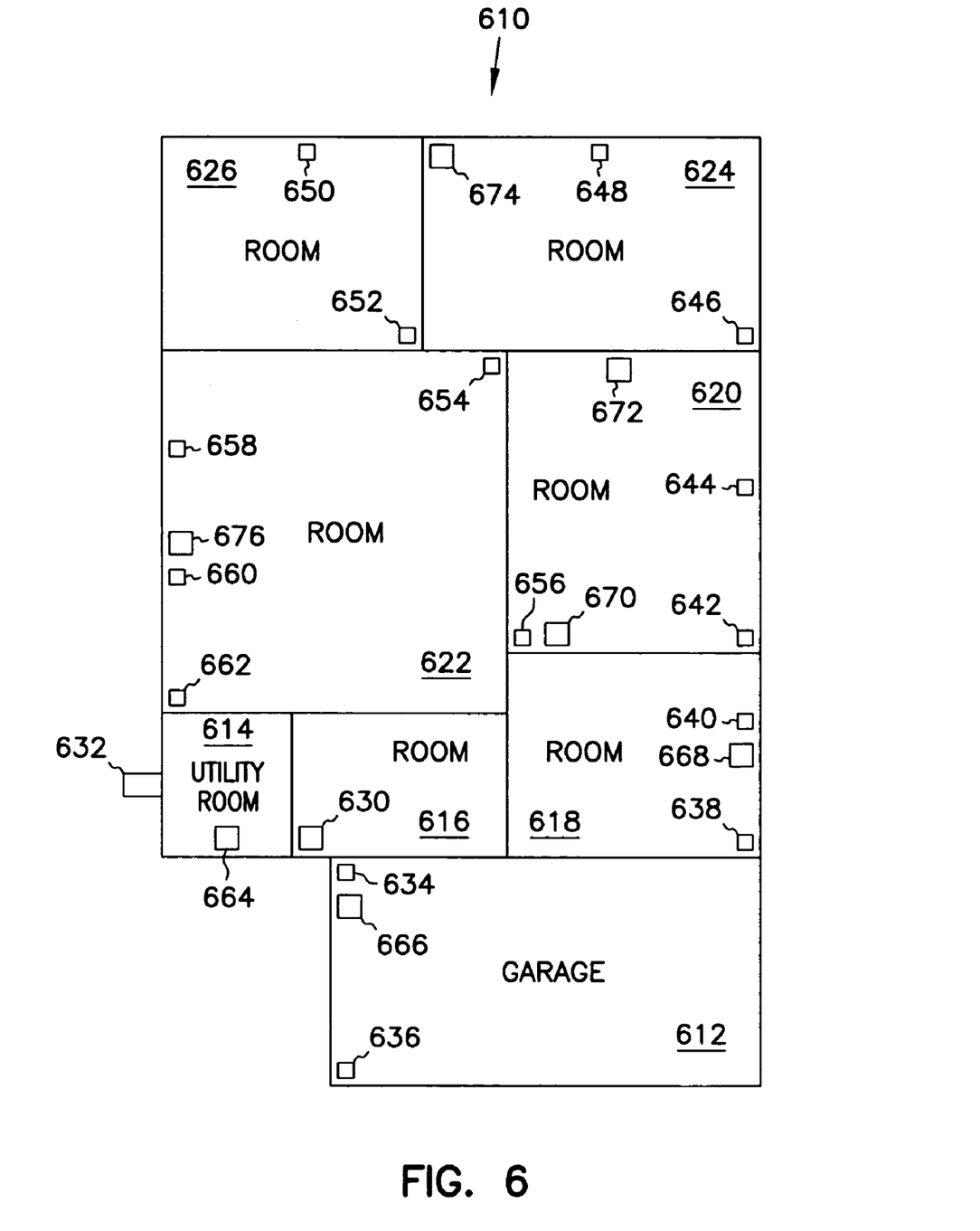
FIG. 6 is a block diagram of an alternative arrangement of devices and routers in a system in accordance with the present invention.

One potential layout of a home security system is shown at 610 in FIG. 6 in a block diagram format. A typical home comprises a garage 612, utility room 614, mud/laundry room 616 off the garage 612, kitchen 618, family room 620, living room 622, and bedrooms 624 and 626. A system controller 630 is provided in the utility room near an entrance from the garage 612 for the convenience of the homeowner. The system controller 630 is also fairly conveniently located near a point at which utilities lines enter the home at 632. As mentioned earlier, it may be disposed between external phone lines and the home phone wiring such that a telephone may serve as a user control panel. Controller 630 may also be equipped with a wireless telephone chip set to receive control commands from a cordless or cellular phone. Several devices, such as sensors equipped with low power transceivers are dispersed throughout the home at 634, 636, 638, 640, 642, 644, 646, 648, 650, 652, 654, 656, 658, 660, 662, and 664. Routers are also placed throughout the home proximate to selected sensors as indicated at 666, 668, 670, 672, 674, and 676. Routers 666, 676, 670 and 668 are configured to transmit directly to controller 630, while router 672 first transmits to router 670, and router 674 transmits directly to router 672. In this manner, all of the sensors are located within about 10 to 20 feet of a router, and no hard wiring is required for sensors 650 and 648 which are located furthest from the controller. Outbuildings can also be equipped with routers and sensors in the same manner. Router 676 may be located near a front door of the home or other type of building, and may contain a video transducer for viewing of visitors, invited or uninvited. Since the router 676 is on the high bandwidth network, sufficient bandwidth exists to accommodate the video information.

Router 674 may be hardwired to a baby video monitor, which requires high bandwidth. A display, such as a personal computer display may then be coupled to router 672 for displaying the video output from the monitor which is transmitted directly to router 672 from router 674. It should also be noted that a router may be directly coupled to other, lower bandwidth devices if desired. This may further reduce the cost of a system, where only one remote device is required. It may be provided without the requirement of providing both a router and a node 1 transceiver with the device.

Figure 7:
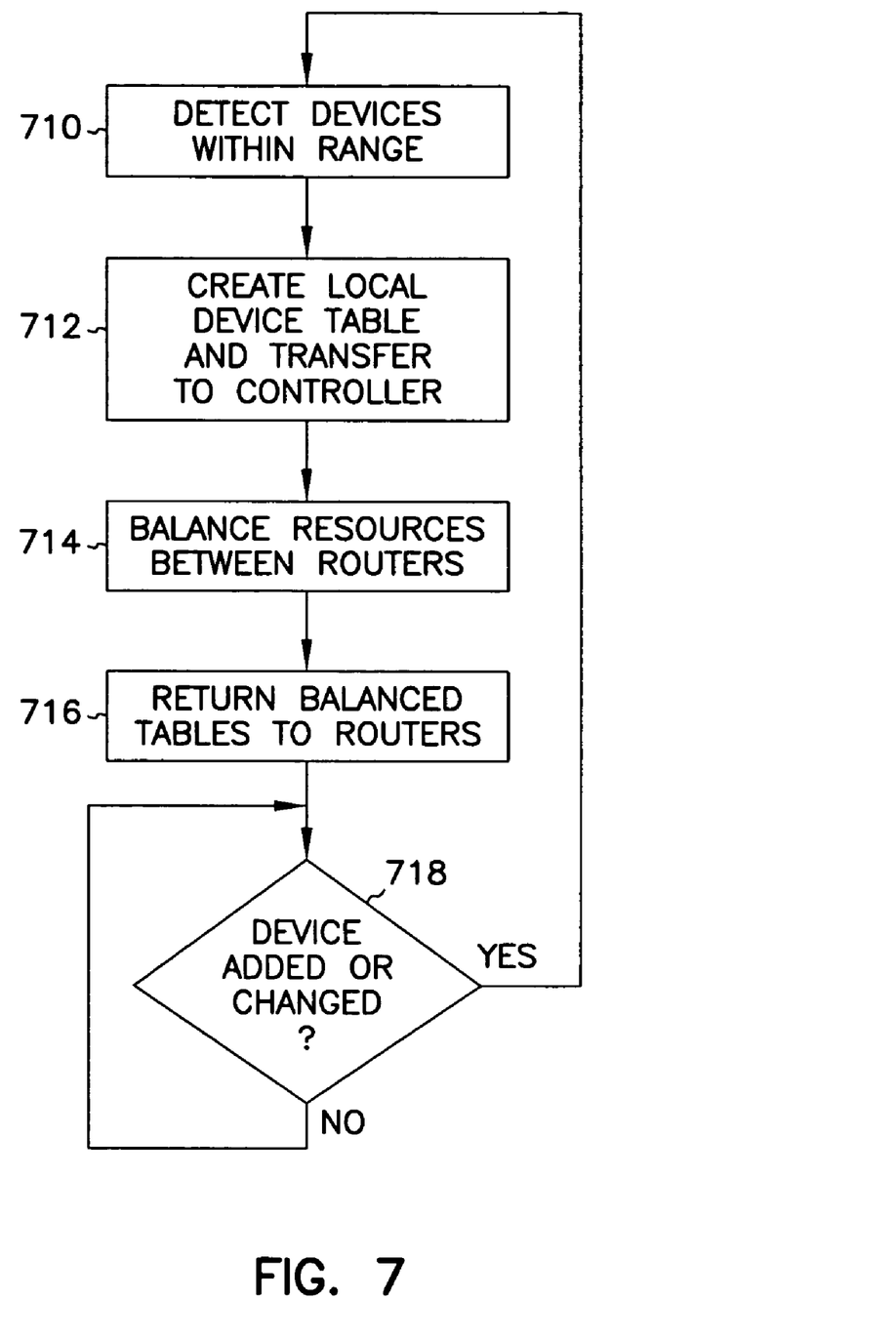
FIG. 7 is a block flow diagram showing the steps involved in automatically generating a router table.

Generation of the previously mentioned routing table is described in detail with reference to a flowchart in FIG. 7. Different elements of the flowchart may be implemented at the router and controller levels as desired. Each router detects devices within range at 710. A local router table identifying the router and the devices from which signals are clearly received is created at 712 and the table is transferred to the controller. The controller receives all the router tables and creates a master router table or tables based on supporting and pre-defined quality of service (QoS) or signal priority. In other words, if a device is within range of more than one router, a router is selected based on number and priority of devices each router is servicing to ensure that high priority devices are served and that few low priority devices are preempted. During normal operation, QoS to lower ranking devices is lowered as critical applications need to use the two tier communication system to ensure services to critical applications. One potential ranking of functions provided by devices from highest priority to lowest priority comprises: fire, security, voice-commands/intercom, lighting, HVAC, video conferencing, digital data distribution, video monitoring, and entertainment (audio/video distribution.) Each ranking will depend on the particular system being used, with process control functions being ranked based on critical process control parameters and alarms. At 716, tables for each route are returned to the tier 2 routers which identify the tier 1 devices which should be serviced by each router, as well as identifying which routers transmit information to each other in order to provide for orderly communications between routers, devices and the central controller. If a new router, device, or a changed device is detected by a router at 718, the process of creating a router table is repeated starting at 710 to reestablish it. In this manner, a dynamic routing table is created, allowing adding and removing of routers and devices. Resource management is also provided to ensure timely detection and communication of information from prioritized devices. The dynamic creation of routing tables enables easy installation of two tier wireless monitoring and control systems. An installer need not have extensive training and knowledge of detailed configuration information, as the system automatically configures itself. The installer need only place devices where desired, and ensure that routers are placed at locations sufficient such that each device can be received by at least one router.

It is to be understood that the above description is intended to be illustrative, and not restrictive. The functions provided by the system described are performed in discrete locations. Other lower level communication protocols and routing mechanisms may be used without departing from the scope of the invention. One of ordinary skill in the art can easily shift the functions to other parts of the system without departing from the scope of the invention. Functions implemented in hardware or ASICs may be performed by software. While approximate frequencies have been discussed, it should be apparent to those skilled in the art that as communication technology advances, higher bandwidths will become available, and both the first and second tier bandwidths will increase without departing from the spirit and scope of the invention. A third tier of wireless communication devices may be easily added, and would provide yet a higher bandwidth and transmission distance for applications which involve distances between devices which exceed the range of tier 2 routers. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A system comprising:
    a plurality of devices, each device coupled to a low power transceiver that transmits over a short range, and receives information, wherein at least one of the devices is selected from the group consisting of sensors, actuators, and controllers;
    a plurality of router nodes, each router node having a transceiver capable of receiving device information from one or more proximate wireless devices and capable of wireless communication at a higher power level with other router nodes; and
    a controller coupled to at least one router node for receiving device information, wherein the router nodes transmit device information either to the controller or to another router for further transmission of the device information.

2. The system of claim 1 wherein the low power transceiver has a lower data bandwidth capability than the bandwidth of the communication between router nodes at the higher power level.

3. The system of claim 1 wherein at least one of the devices further comprise a battery for supplying power to the low power transceiver.

4. The system of claim 1 wherein one of the routers is hardwired to a device which generates high bandwidth information.

5. The system of claim 1 wherein the controller is coupled between a telephone wiring network in a structure and external telephone lines.

6. The system of claim 5 and wherein the controller is capable of intercepting touch tones transmitted on the telephone wiring network in the structure and interpreting them as controller commands.

7. The system of claim 6 wherein the controller transmits information via the routers to devices in accordance with the touch tone commands.

8. The system of claim 1 wherein the controller further comprises circuitry to receive transmissions representative of controller commands from a wireless telephone.

9. A monitoring system comprising:
a plurality of devices, each device having a low power battery operated transceiver that communicates information over a short range, provided by the device, wherein at least one of the devices is selected from the group consisting of sensors, actuators, and controllers;
a router having a transceiver that receives communications from at least one selected device and transmits further communications via a higher power transceiver to other routers; and
a controller communicatively coupled to a router.

10. The system of claim 9 wherein the low power transceiver has a lower data bandwidth capability than the bandwidth of the communication between routers.

11. The system of claim 9 wherein one of the routers is hardwired to a device which generates high bandwidth information.

12. The system of claim 9 wherein the controller is coupled between a telephone wiring network in a structure and external telephone lines.

13. The system of claim 12 and wherein the controller is capable of intercepting touch tones transmitted on the telephone wiring network in the structure and interpreting them as controller commands.

14. The system of claim 13 wherein the controller transmits information via the routers to the device in accordance with the touch tone commands.

15. The system of claim 9 wherein the controller further comprises circuitry to receive transmissions representative of controller commands from a wireless telephone.

16. A network of router nodes communicatively coupled to a central controller of a security monitoring system, the network comprising:

a first router node hardwired into the central controller;
a second router node having a first receiver for receiving low power transmissions of physical condition related information from a plurality of devices located proximate the second router node, a second receiver for receiving high bandwidth transmissions from other routers in the system, and a first transmitter coupled to the first and second receivers that transmits information from the plurality of devices at a relatively high power to the first router node.

17. The network of claim 16 and further comprising a plurality of further router nodes located proximate to a further plurality of devices transmitting at low power.

18. The network of claim 17 wherein at least some of the plurality of further router nodes transmit information from the proximate devices to the first router node.

19. A router node in a physical condition monitoring system, the router node comprising:
a first transceiver that receives low power transmissions of information from a plurality of devices located proximate the router node, wherein at least one of the devices is selected from the group consisting of sensors, actuators, and controllers; and
a second transceiver that receives high bandwidth transmissions from other routers in the system, wherein the second transceiver further transmits information from the plurality of devices at a higher power level than the received low power transmissions.

20. The router node of claim 19 wherein the second transceiver operates at an unlicensed spread spectrum frequency range.

21. The router node of claim 20 wherein the frequency range is selected from the group consisting of 900 MHZ, 2.4 GHz, and 5.8 GHz.

22. The router node of claim 19 and further comprising a device which is hardwired directly to the router node for direct communication of high bandwidth information.

23. The router node of claim 22, wherein the hardwired device comprises a video camera.

24. The router node of claim 23, wherein the router node transmits high bandwidth compressed video to other routers at the higher power level.

25. A system comprising:
a plurality of means for transmitting information at a low power and receiving information;
a plurality of means for being located proximate to and receiving device information from one or more of the means for transmitting information at a lower power and for wireless communication at a higher power level with other such means for being located proximate to and receiving device information; and
means for controlling the plurality of means for being located proximate to and receiving device information.

* * * * *